June 8, 1965   W. S. ATTWOOD   3,188,131
VEHICLE BODY STRUCTURE
Filed Oct. 18, 1962   8 Sheets-Sheet 1
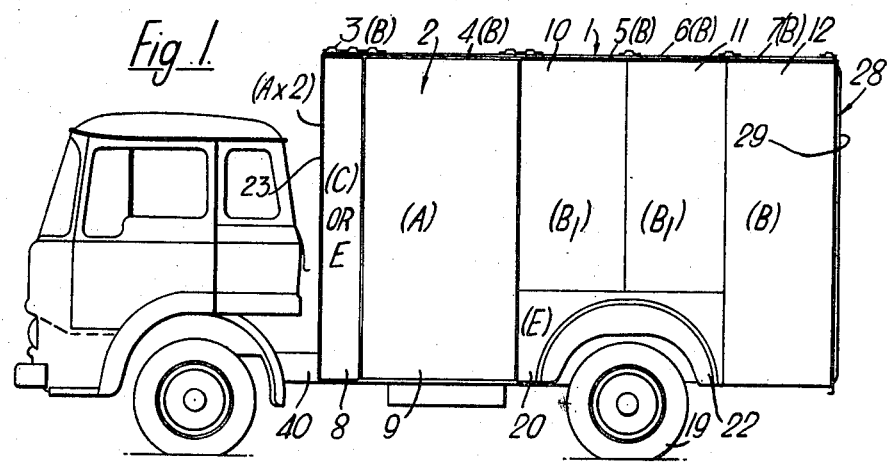
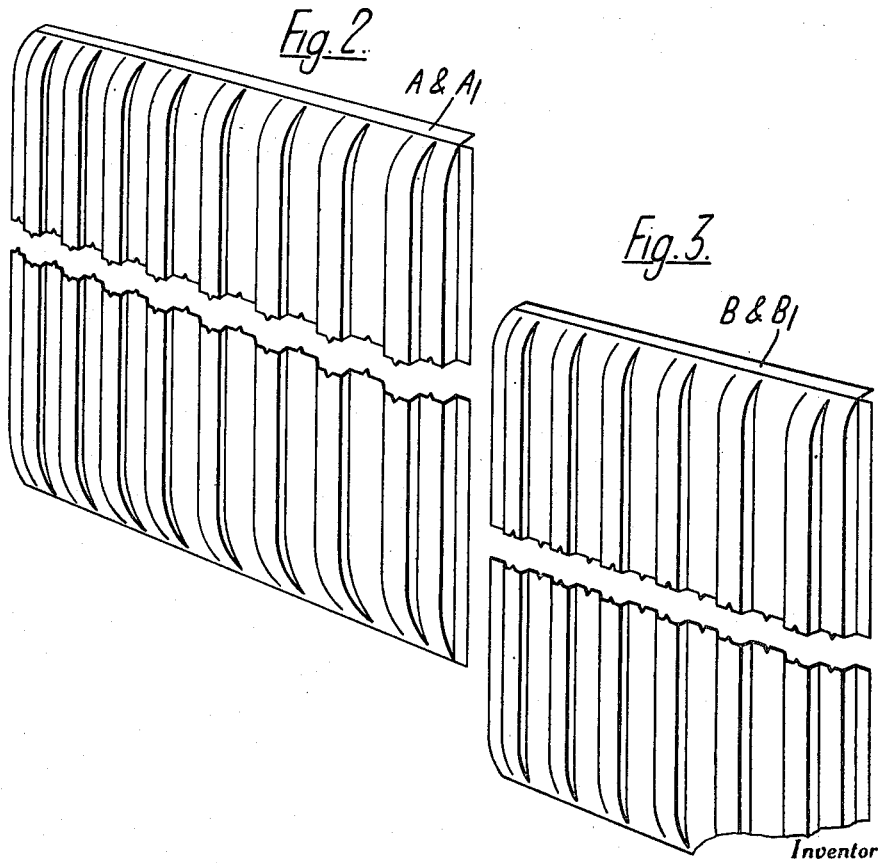
Inventor
William Spencer Attwood
By
E. E. James
Attorney

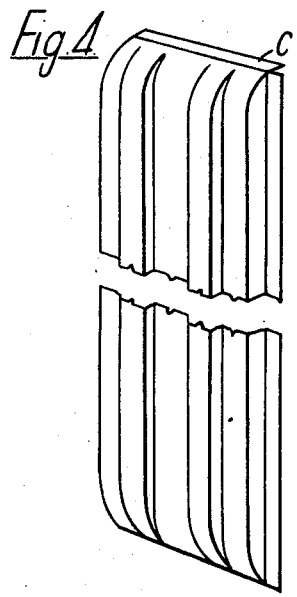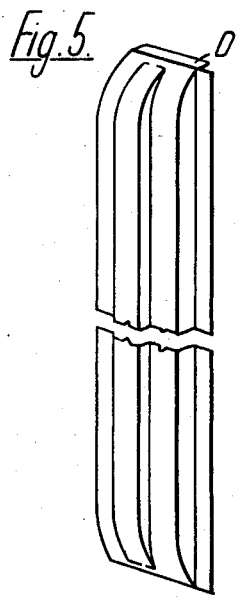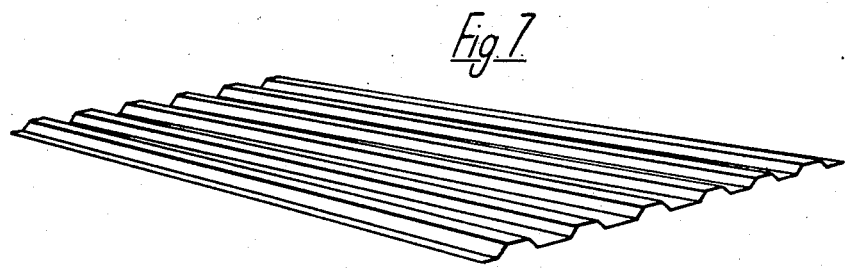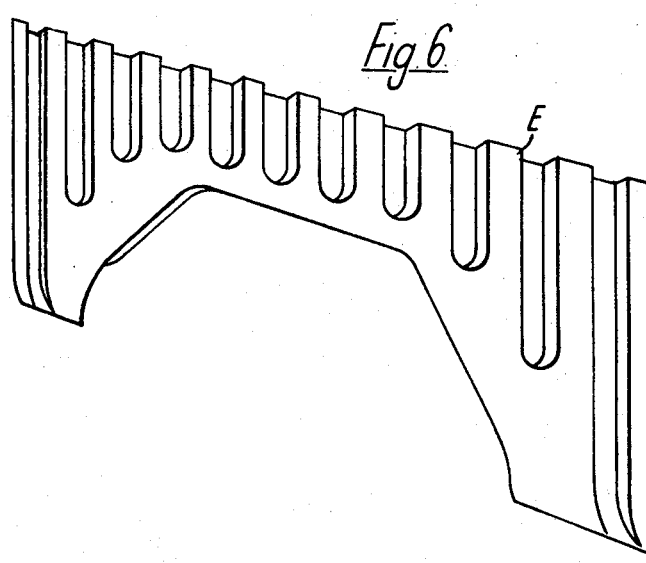

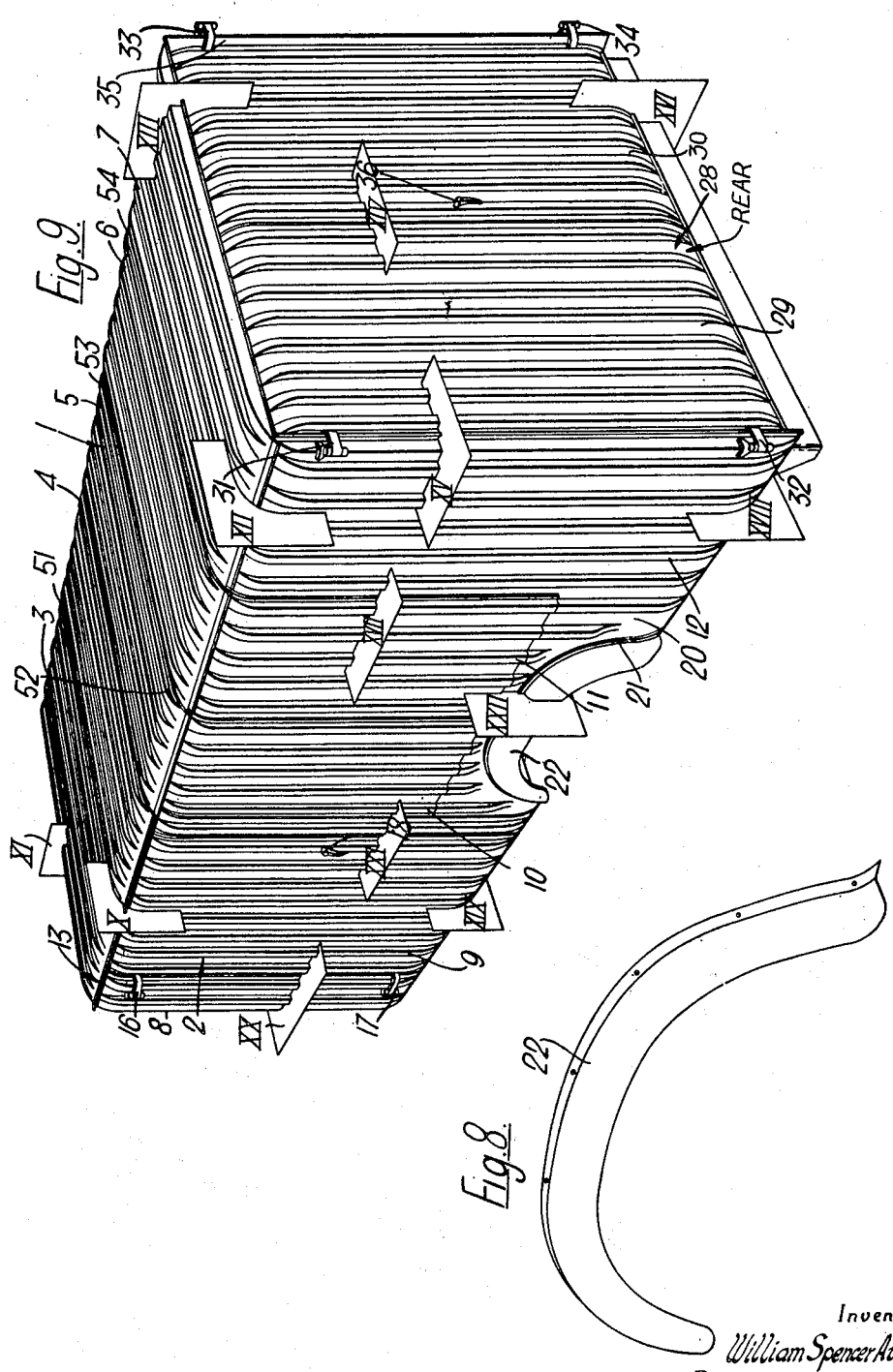

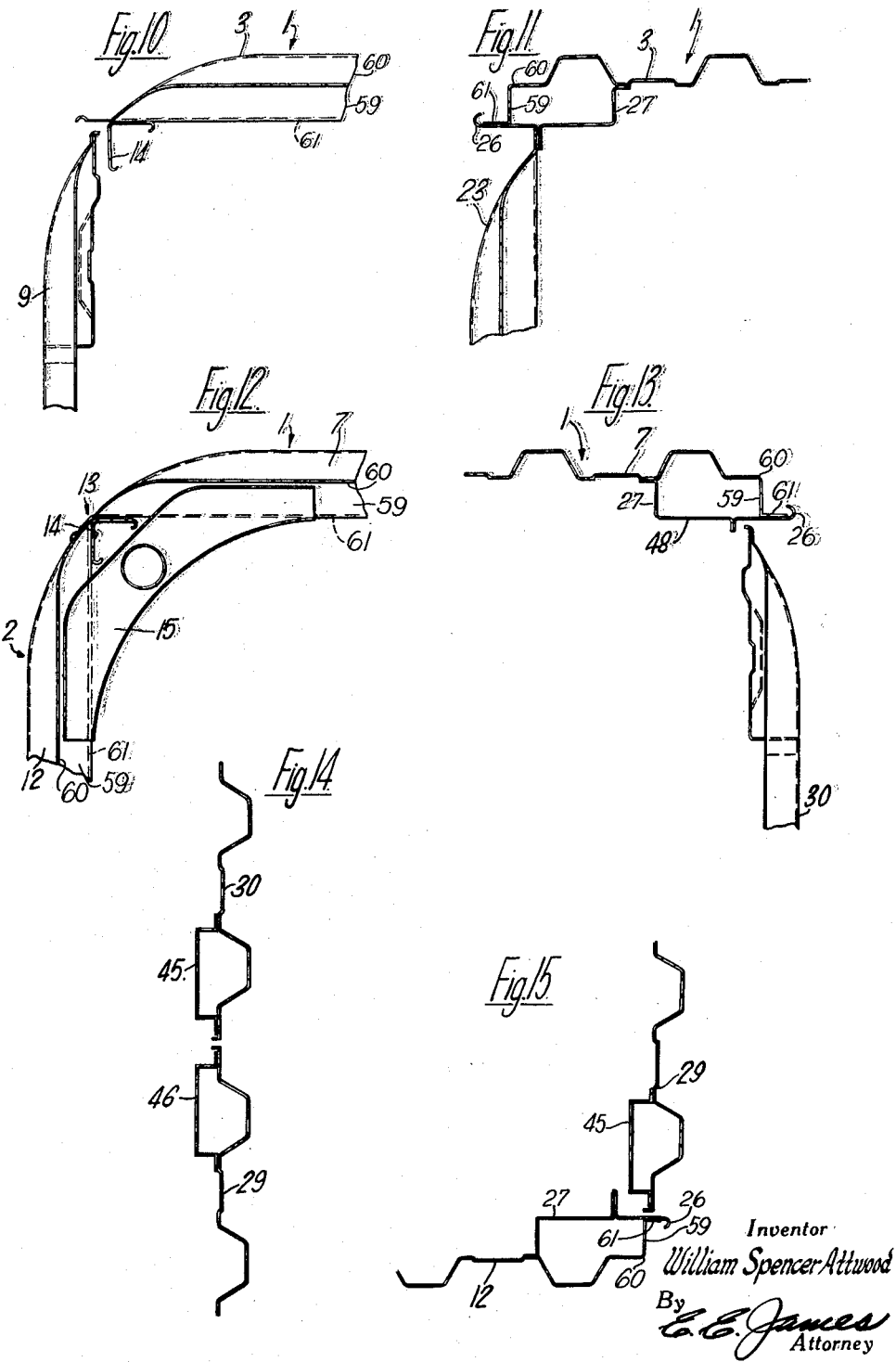

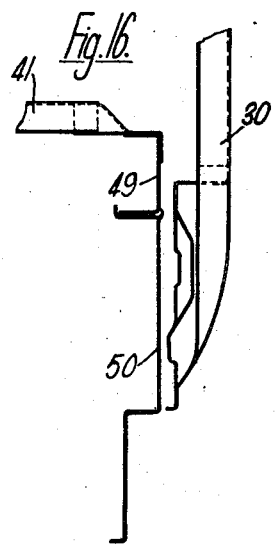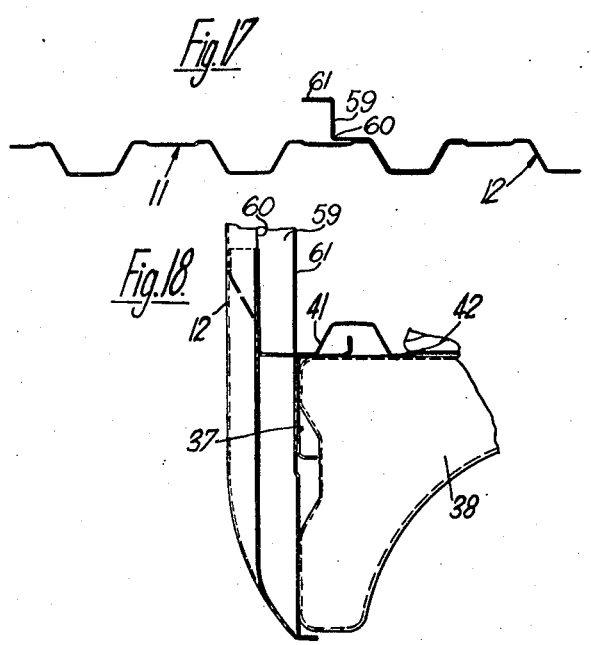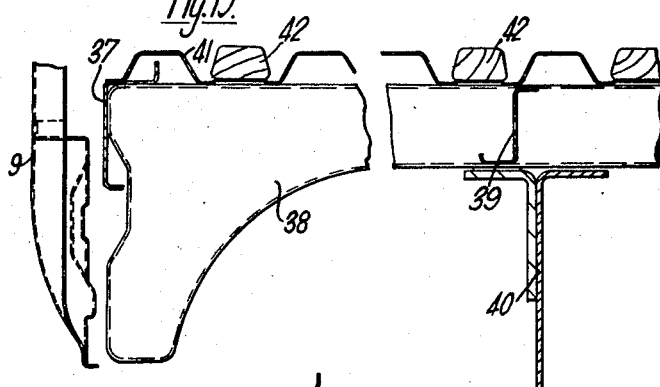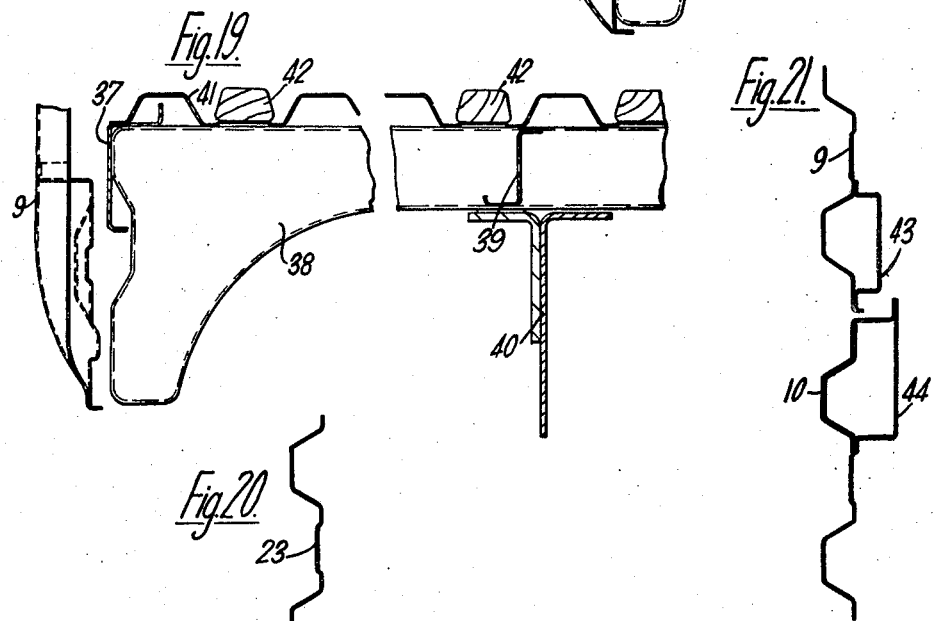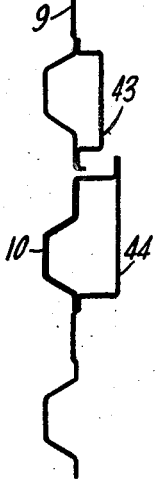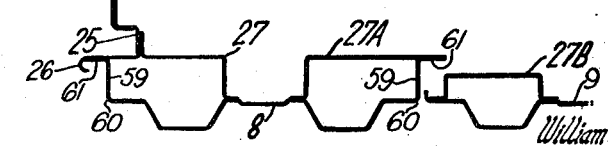

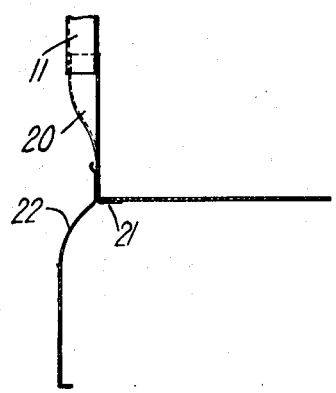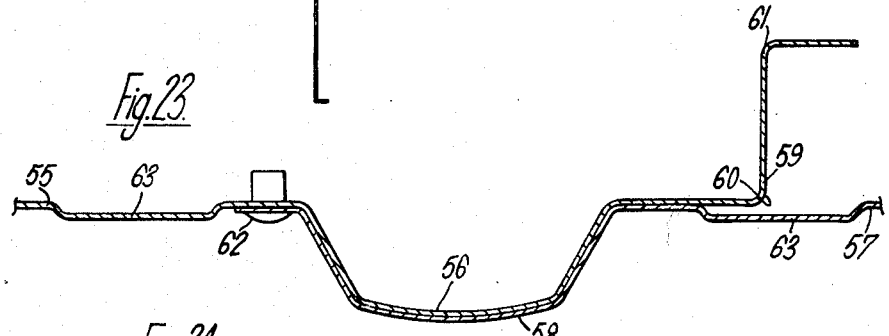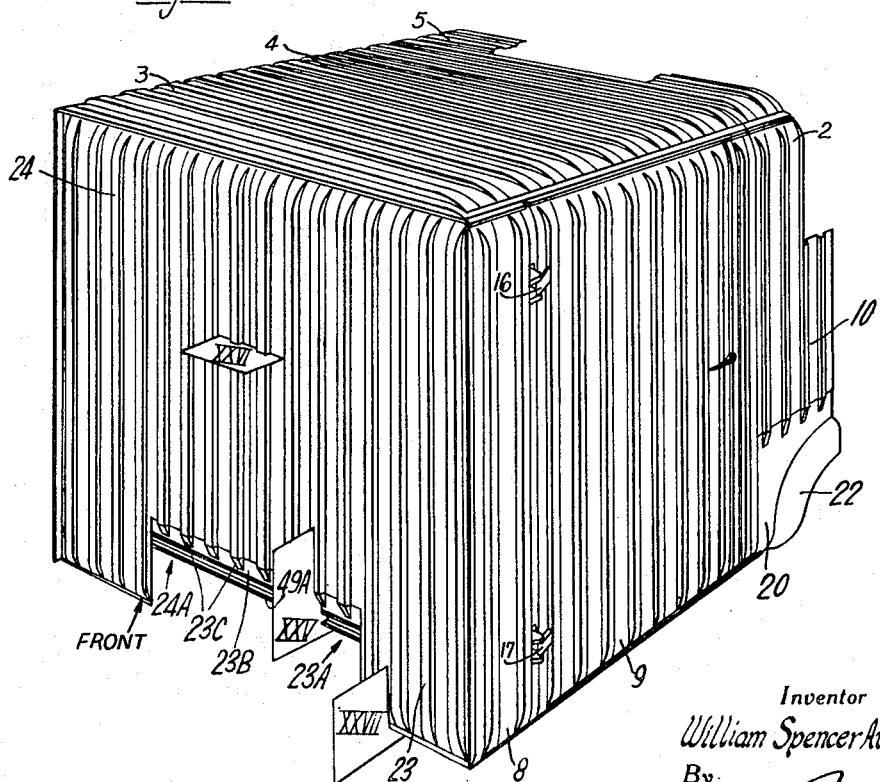

June 8, 1965  W. S. ATTWOOD  3,188,131
VEHICLE BODY STRUCTURE
Filed Oct. 18, 1962  8 Sheets-Sheet 7

Inventor
William Spencer Attwood
By C. C. James
Attorney

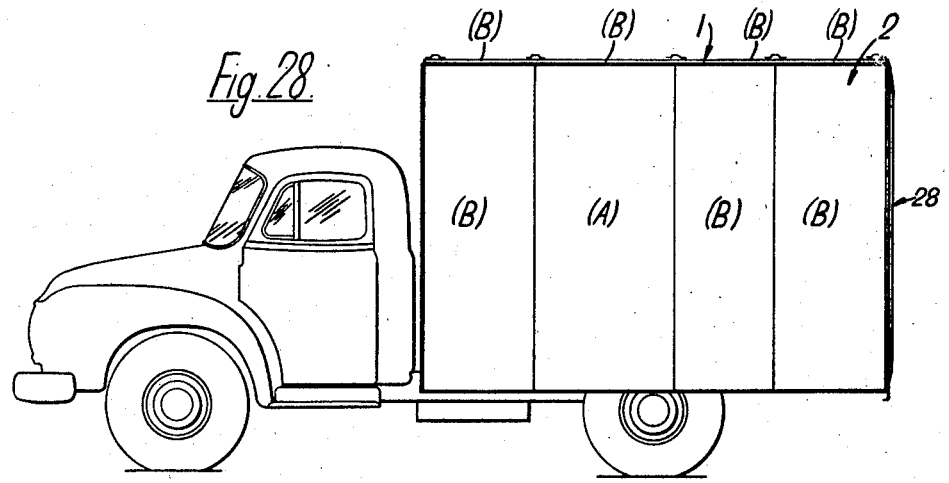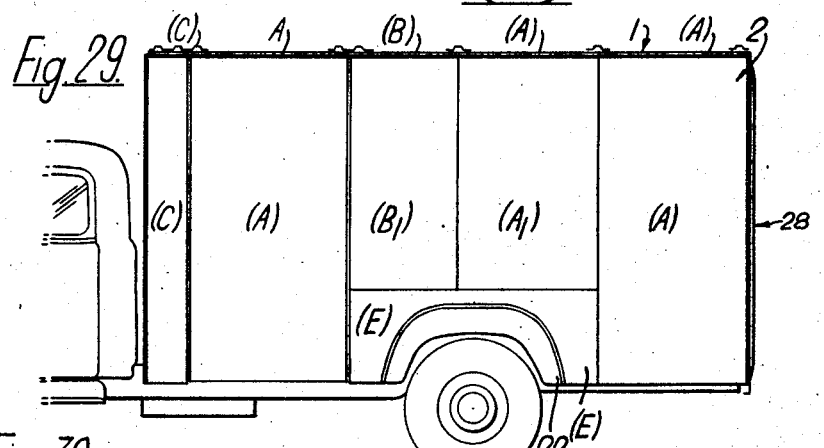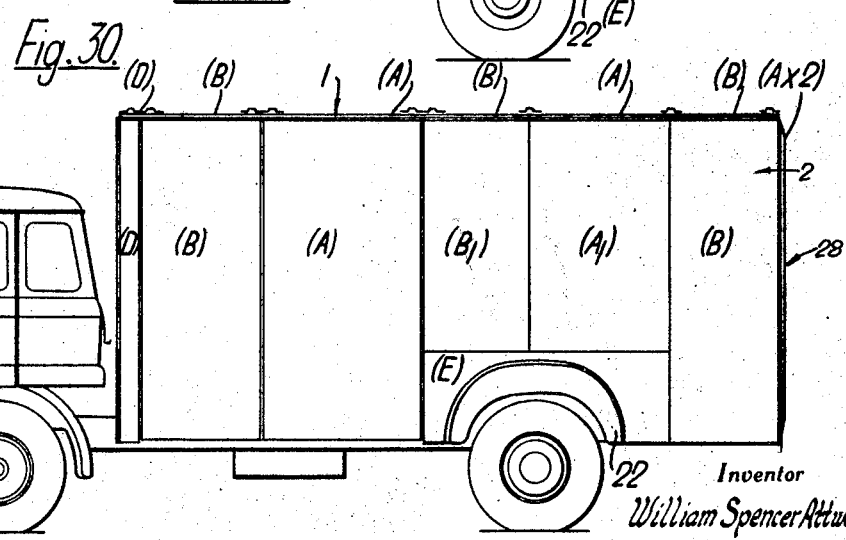

United States Patent Office 3,188,131
Patented June 8, 1965

3,188,131
VEHICLE BODY STRUCTURE
William Spencer Attwood, St. Albans, England, assignor to General Motors Corporation, Detroit, Mich., a corporation of Delaware
Filed Oct. 18, 1962, Ser. No. 231,508
14 Claims. (Cl. 296—28)

This invention relates to a body structure suitable for a cargo hauling vehicle and broadly contemplates an improved vehicle body of simple, economical, easily fabricated construction providing a relatively strong and extremely rigid cargo receiving compartment.

With regard to certain of its more specific aspects, the invention further contemplates the modular construction of such improved vehicle bodies from a plurality of standard metal panels suitably joined and reinforced to provide desired variations in the size and access provided to the cargo receiving body compartments of different vehicles.

The several objects and advantages of the invention are obtained in several illustrative motor vehicles having enclosed van type bodies constructed from various corrugated metal panels of various standard shapes and sizes. In accordance with the invention, these body forming panels are suitable joined along overlapping edges and reinforced by cooperating structural members to form the roofs, side walls, and access door openings to the cargo receiving compartments of the illustrative bodies. The corrugations of the side wall and door forming panels extend vertically and those of the roof panels extend transversely of the several bodies. A joint reinforcing flange may be formed inwardly of each inner panel adjacent its overlapped joint forming edge. The joined corner forming edges of the roof and side wall panels are preferably fastened inwardly to longitudinal structural members of angled section. The transverse opposite ends of each roof panel may be further secured to the upper ends of the side panels joined thereto by body strengthening angled members forming architraves spaced longitudinally of the vehicle.

Corrugated panels similar to the roof and side wall panels form the vehicle body floor. These floor panels mount wooden cargo supporting slide rails in depressed parallel corrugations extending longitudinally of the body. Beams or joists of box section are spaced longitudinally of the body and support the floor transversely above the longitudinal rails of the vehicle chassis frame. These transverse beam members have depending architrave forming end portions and are outwardly interconnected longitudinally of the body by side rails and inner cross beam members. The reinforced lower ends of the several side wall panels are secured to the architrave forming end portions of the transverse beam members and to the adjacent beam interconnecting side rail thus providing a substantial body rigidizing connection therebetween.

The foregoing and other objects, advantages and features of the invention will be apparent from the following description of a preferred illustrative embodiment, having reference to the accompanying drawings, in which:

FIGURE 1 is a somewhat diagrammatic side elevational view of a motor road vehicle or truck having a van body fabricated from standard metal panels and structural components in accordance with the invention;

FIGURES 2–6 are perspective views of corrugated metal panels from which the sides, roof and ends of the van body shown in FIGURE 1 and other vehicle bodies may be built;

FIGURE 7 is a perspective view of a corrugated metal floor panel;

FIGURE 8 is a perspective view of a rear fender panel;

FIGURE 9 is an enlarged perspective view, taken from the rear quarter, of a van body similar to that shown diagrammatically in FIGURE 1;

FIGURES 10–22 are enlarged fragmentary sectional views taken substantially in the planes X through XXII indicated respectively in FIGURE 9;

FIGURE 23 is an enlarged sectional view similar to FIGURE 17 and shows the overlapping joint forming edges of two corrugated panels secured together in accordance with certain aspects of the invention to provide a relatively light, strong and extremely rigid wall structure;

FIGURE 24 is a perspective front quarter view of the body shown in FIGURE 9;

FIGURES 28–30 are somewhat diagrammatic side elevational views similar to FIGURE 1 and show other van bodies obtainable from the various metal panels shown in FIGURES 2–8.

Figure 25:
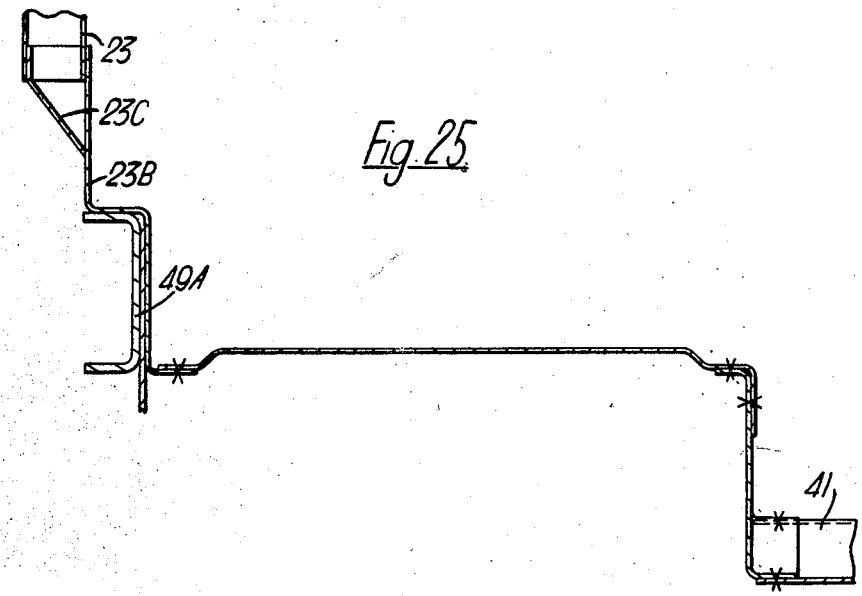
FIGURES 25–27 are enlarged fragmentary sectional views taken substantially in the corresponding planes XXV through XXVII indicated in FIGURE 24.

The vehicle van body illustrated diagrammatically in FIGURE 1 and shown in perspective elevation in FIGURES 9 and 24 has side walls, roof, end walls and doors made of corrugated metal panels. The basic body structure is formed by the roof 1 and sides 2 of similar arrangement but of opposite hand. The roof may be formed of substantially identical panels 3 to 7 suitably joined together along their overlapped edges as by rivets or bolts. The sides are similarly formed by panels 8 to 12 of various standard sizes. The panels forming the roof and sides are arranged one behind the other, looking in the fore-and-aft direction of the body. The side panels 10, 11 and 12 have overlaps which run in the vertical direction; and the roof panels 3 to 7 have overlaps which run in the direction transversely of the body. Each overlap is the same, and is formed as shown in FIGURES 17 and 23. The roof panels are connected on each side to the side panels 8, and 10 to 12 by a joint 13 along the roof edge running from the front of the body to the back. On each side there is a longitudinal bar 14 of angle section (FIGURES 10 and 12) placed within the roof edge corner formed by the meeting of the roof 1 and the sides 2; to this bar 14 the adjacent edges of the roof panels 3 to 7 and the side panels 8 and 10 to 12 are fastened, the construction being the same on the opposite side. The roof and sides are further braced by architrave forming brackets 15 which connect the roof panels to the side panels at intervals.

The opposite sides of the body each include a door formed by a single panel 9. This door is hinged at 16, 17 on a narrow front corner side panel 8 and is opened by a suitable latch operating handle 18. The door panel 9 is therefore not secured to the adjacent panels 8 and 10, nor to the nearest roof panels 3 and 4; see FIGURES 20 and 21.

The side panels 10 and 11 which lie over each rear wheel 19 have their bottom parts continued by a separate valance panel 20 having corrugations which overlap and continue those of the side panels 10, 11 above, and run out flat short of an arcuate cut-out 21 accommodating the wheel. A curved fender 22 is secured to the cut-out 21; see also FIGURE 22.

The van body is completed by a front end, a floor and a rear end including double doors, all of which are made of corrugated metal panels.

Figure 26:
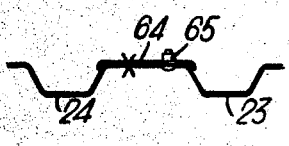

The front end consists of two panels 23, 24 (FIGURES 20 and 24 to 27) secured at their outer edges by flanged structural members 25, 26 and 27 which complete the forward corrugations of the panels 8 into box-section. Each of the panels 23, 24 is of the type A referred to below (see FIGURE 2) with a portion cut away at 23A, 24A to accommodate the side members 40 of the vehicle chassis. To finish the bottom edges where the portions have been cut away, a finishing strip 23B having tapered channels 23C is secured to the lower cutaway lower edges and, as shown in FIGURES 24 and 25, form "run-outs" for the corrugations of the panels 23, 24. The panels 23, 24 are secured to a transverse channel member 49A at the bottom. The panels 23, 24 do not overlap centrally in the illustrative embodiment but are instead joined together by a junction piece 64 of shallow channel section. As shown in FIGURE 26, this junction piece may be welded to one panel and bolted to the other.

The rear end 28 is formed by double doors 29, 30 consisting of corrugated metal panels of type A (FIGURE 2) which, when closed, meet centrally but do not overlap. As shown in FIGURE 9, the door 29 is hinged at 31, 32 to the rear side panel 12 and the door 30 is hinged at 33, 34 to the opposite rear side panel (see also FIGURES 13 to 16). A suitable latch operating handle 36 is provided on the door 30.

At the floor level, the body comprises two laterally spaced, longitudinally extending side rails 37 of channeled section. These side rails are secured to the opposite depending, architrave forming outer ends of transverse joist or beam members 38. The beam members are preferably of box section as shown in FIGURES 18 and 19. These floor supporting beams are interconnected inwardly of the longitudinal side rails 37 by longitudinal cross members 39. The entire body is mounted on two side members 40 of the vehicle chassis frame. The beam supported floor of the body is made up of metal panels 41 having corrugations running fore-and-aft and similar in cross section to those of the roof and side panels. Wooden slats 42 are mounted in the depressed corrugations of the floor panels and project upwardly above the ridges of the adjacent corrugations to form cargo supporting slide rails. The lower ends of the several side panels are secured to the architrave forming end portions of the transverse floor supporting beams and to the beam interconnecting side rail channels to form substantial body rigidizing connections therebetween.

The corrugations of each side or end panel run vertically, as shown in FIGURE 9, but the corrugations of the roof panels run transversely of the vehicle. The fixed side panels 10, 11, 12 have their meeting edges overlapped, as shown for example in FIGURE 17; and there are similar overlaps at the meeting places 51 to 54 of the roof panels 3 to 7. Each overlap (FIGURE 23) is of such an extent that a corrugation or channel 56 of one panel 55 fits into a corrugation channel 58 of the next panel 57. At each of these overlaps the edge of the inner panel such as 55 has an inwardly turned flange 59, formed by bending the metal inwards through a right angle 60 and then bending it again through another right angle 61. Thus the edge of each panel at the overlap has an inward flange 59, 60, 61 of right-angle section which runs vertically up the side walls and is continued across the roof by the corresponding edges of the roof panels. These flanges provide stiffness. The roof and side panels are secured at the overlaps by rivets or bolts, such as 62 (FIGURE 23).

The corrugation channels of all the panels are of trapezium shape in section; see the sectional FIGURES 10 to 22. These corrugations, in the case of the side panels, run out flat into edge defining flanges at the bottom and at the top where they meet the roof panels; similarly, the corrugations in the roof panels run out flat into edge defining flanges at each end where they meet the tops of the side panels. The run-out formed end flanges are clearly shown in the drawings.

In all the corrugated panels the main trapezium-shaped corrugation channels, such as 56, 58, in FIGURE 23 are spaced apart, and have between them shallower corrugation channels 63.

Along the door edges and the door frames the rigidity and strength of the side walls and of the doors may be increased by securing additional structural members 27A, 27B and 43 through 46 inwardly of the edge adjacent corrugations or channels of the several panels 8, 9, 10, 29 and 30 thus forming body framing and reinforcing box-sections at each of these critical places (see FIGURES 14, 15, 20 and 21).

As indicated above with reference to FIGURE 20, the side panel 8 is strengthened at its front corner by cooperating box-section forming structural members 26 and 27. The rear door mounting edges of the rear side panels 12 may be framed and strengthened as shown in FIGURE 15 by similar structural members. The roof panels 3 and 7 at the front corner and rear roof edge of the body may also be formed and similarly strengthened by structural members 26 and 27 as shown in FIGURES 11 and 13.

At floor level at the rear, a transverse channel member 49 (FIGURE 16) similar to the front transverse channel 49A forms a rear door sill and mounts a valance 50 forming a fairing depending below the rear door opening.

FIGURES 2 to 7 show the corrugated panels from which the body illustrated in FIGURES 1 and 9 is built up. FIGURE 2 shows a wide panel which may be made to a long size A or a short size $A_1$. The narrow panel in FIGURE 3 may be made to a long size B or a short size $B_1$. The panels A, $A_1$, B and $B_1$ may be used to form the sides, roof, front and end doors of van bodies. To finish the corners, the wide corner-panels C of FIGURE 4 and the narrow corner-panels D of FIGURE 5 are provided. FIGURE 6 shows a rear valance panel E with a cut-out to enclose the rear wheel; and FIGURE 7 shows a floor panel which is corrugated but does not have "run-outs" at the ends. FIGURE 8 represents a rear fender panel which may be varied in size to accommodate different sizes of tires. The standard panel units which make up the van body of FIGURE 9 are indicated in FIGURE 1 by the bracketed letters.

Figure 27:
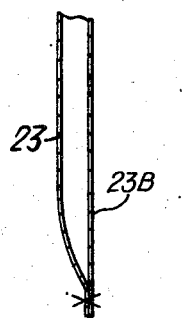

Similar van bodies of different sizes may be easily constructed from the several standard or basic panel units indictaed above when assembled in different ways so as to increase or reduce the length or other dimensions of the body. FIGURES 27, 28 and 29 illustrate other examples of van bodies so made. The type of panels used are indicated in each of these figures.

From the foregoing description, it will be apparent that various changes might be made in the illustrative van body structures without departing from the spirit and scope of the invention as defined in the following claims.

I claim:

1. In a vehicle body, a wall structure comprising a pair of panels each having at least one corrugation formed adjacent and extending parallel in spaced relation to one edge thereof, said edge adjacent corrugations being internested to overlap the edge adjacent portions of the panels, the overlapping edge portion of one of the panels forming a flange extending from the adjacent corrugation therein and engageable with a corrugation adjacent portion of the other panel, the overlapping edge portion of the other panel having a first flange portion engageable with a corrugation adjacent portion of said one panel and having a second flange portion extending laterally therefrom, and means securing the internested corrugations and flanged edge portions of the panels together to form a wall joint therebetween and said second flange portion forming a joint reinforcing rib extending longitudinally of the wall joint formed between said panels.

2. A wall structure for a vehicle body including a pair of corrugated panels having overlapping edge portions, said panels each having base wall positions impressed to form spaced corrugations extending parallel to said overlapping edge portions, at least one corrugation being formed in the overlapping edge portion of one panel and in spaced relation to the edge thereof and internested with a corrugation similarly formed in the overlapping edge portion of the other panel, the overlapping edge portion of said one panel forming an edge defining flange extending from the adjacent one corrugation and adapted to engage a wall portion extending between adjacent corrugations formed in the other panel, the overlapping edge portion of the other panel having a first flange portion extending from the adjacent corrugation and adapted to engage a wall portion extending between adjacent corrugations formed in said one panel and a second edge defining flange portion extending laterally from said first flange portion, means securing the internested and overlapping corrugations and flanged edge portions of the panels together to form a wall joint therebetween, and said second flange portion forming a reinforcing rib extending longitudinally of the wall joint formed between said panels.

3. In a vehicle body, a pair of corrugated body panels having overlapping edges and spaced corrugations parallel to said edges, said corrugations each including a base wall and a pair of spaced oppositely inclined side walls joined by intermediate wall portions, at least one edge adjacent corrugation formed in one panel being internested with at least one corrugation extending adjacent the overlapping edge of the other panel, the edge adjacent portion of said one panel forming a base wall flange extending from the side wall of the adjacent corrugation and engageable with an adjacent base wall portion of the other panel, the edge adjacent portion of the other panel having a first base wall flange portion extending from the side wall of the adjacent corrugation and engageable with an adjacent base wall portion of said one panel and having a second flange portion extending laterally therefrom, means securing the internested and overlapping edge portions together to form the wall joint between said panels, and said second flange portion forming a rib structurally reinforcing and extending longitudinally of the wall joint formed between the overlapping panels.

4. The combination recited in claim 3 wherein the base wall portions of each panel are provided with relatively shallow corrugations extending parallel to the first-mentioned corrugations and said securing means joining the shallow corrugations adjacent the internested deeper corrugations to the edge adjacent flange of the panel engaged thereby.

5. In the combination set forth in claim 3, the edge adjacent portion of said other panel having a third flange portion extending laterally to said second flange portion and generally parallel to said first flange portion and said other panel corrugation in spaced relationship thereto and thereby cooperating with the first and second flanges on said other panel to further stiffen the wall joint formed between said panels.

6. A relatively lightweight, high-strength, rigid wall structure comprising a pair of panels, said panels each having at least one corrugation extending in parallel spaced relation and adjacent one edge thereof, said edge adjacent corrugations being internested to overlap the edge adjacent portions of said panels, the overlapping edge portion of each of said panels forming a first flange extending from the adjacent corrugation therein and engaging an adjacent wall portion of the other panel and the overlapping edge portion of at least one of said panels having a second flange extending laterally from its first flange, means securing the internested corrugations and the overlapping flanged edge portions of the panels together to form the wall joint between said panels, and said second flange forming a rib extending longitudinally of and structurally reinforcing the wall joint formed between the overlapping edge portions of said panels.

7. A wall structure as set forth in claim 6 wherein at least one of said panels having one of said second flanges has a third edge forming flange extending laterally from its second flange and cooperating with its first and second flanges to further stiffen the wall joint formed between said panels.

8. In a relatively lightweight, high-strength, rigid wall structure, a pair of panels having overlapping edge portions, said panels each having a plurality of corrugations extending parallel to its overlapping edge portion and at least one edge adjacent corrugation of each panel being internested to overlap the edge portions of said panels, each of said panels having a first flange extending from the edge adjacent corrugation therein and engaging an adjacent wall portion of the other panel, at least one of said panels having a second flange extending laterally from its first flange and forming a longitudially extending rib adapted to structurally reinforce and stiffen a wall joint formed between the internested and overlapping edge portions of said panels, at least one of the panels having one of said second flanges having a third flange extending from its second flange in spaced parallel relation to its first flange thereby further stiffening the wall joint formed between said panels, and means securing the internested corrugations and the overlapping flanged edge portions of the panels to form the wall joint between said panels.

9. In a wall structure as set forth in claim 8, the corrugations in each of said panels terminating in oppositely inclined end walls adjacent the edges thereof extending normal to the overlapping edge portions of said panels and said corrugation end walls being outwardly coextensive with panel edge defining flanges obliquely intersecting said second and third flanges.

10. A van body for a motor vehicle having a roof and sides including corrugated metal roof and side panels internested and joined together along overlapped edges extending transversely of the van body, the roof panels being connected on each side of the body to the adjacent upper edges of the side panels by overlapping right-angle joints along the side edges of the roof, each of said roof and side panels having an inwardly-turned joint reinforcing flange formed adjacent at least one of its joint forming overlapped edges extending transversely of the van body, said joint reinforcing flanges on said roof and side panels being spacedly secured to a longitudinal structural member of angled section inwardly adjacent the right angle joints formed therebetween, and each of said roof panels being further secured to each side panel joined thereto by an architrave extending therebetween inwardly of the adjacent longitudinal member.

11. A van body as set forth in claim 10 further including a floor comprising a plurality of panels internested and joined together along overlapping panel edges, a plurality of parallel beam members spacedly supporting said body floor panels tranversely of the vehicle and having depending architrave forming end portions, and structural members interconnecting said beam end portions longitudinally of the body and secured outwardly to the adjacent lower portions of said side panels to form body rigidizing connections therebetween.

12. In a vehicle body having a roof and side walls, a plurality of corrugated metal panels internested and joined together along overlapped vertical edges of the side panels and along overlapped transverse edges of the roof panels, said side panels having corrugations running in the vertical direction and said roof panels having corrugations running in the tranverse direction, said roof and side panels each having an inwardly-turned flange adjacent to and reinforcing the joints formed by their overlapped edges, and said roof panels being further secured on opposite sides of the body to the upper edge of adjacent side panels, the corrugations of said roof and side panels terminating in end walls running out flat and coextensive with panel edge defining flanges overlapped and cooperating to form right angle joints along the side edges of the roof.

13. In a vehicle body as set forth in claim 12, said joint reinforcing flanges on said roof and side panels being spacedly secured to a longitudinal structural member of angled section inwardly of the right angle joints formed therebetween, and each of said roof panels being further secured to each side panel joined thereto by an architrave extending therebetween inwardly of the adjacent longitudinal member.

14. A van body as set forth in claim 13 further including a floor comprising a plurality of panels internested and joined together along overlapping panel edges, a plurality of parallel beam members spacedly supporting said body floor panels transversely of the vehicle and having depending architrave forming end portions, and structural members interconnecting said beam end portions longitudinally of the body and secured outwardly to the adjacent lower portions of said side panels to form body rigidizing connections therebetween.

References Cited by the Examiner

UNITED STATES PATENTS

| 421,653 | 2/90 | Barnes | 105—409 |
| 667,881 | 2/01 | Immler. | |
| 1,690,170 | 11/28 | Joughins | 105—409 |
| 1,922,027 | 8/33 | Carter | 296—28 |
| 2,101,344 | 12/37 | Reynolds. | |
| 2,128,495 | 8/38 | Murphy | 189—86 X |
| 2,152,617 | 3/39 | Thompson. | |
| 2,446,323 | 8/48 | Davis et al. | |
| 2,692,032 | 10/54 | Peterson | 296—28 X |
| 2,711,699 | 6/55 | Keith | 296—28 X |
| 2,953,996 | 9/60 | Allen | 296—28 X |

FOREIGN PATENTS 977,158   11/50   France.

A. HARRY LEVY, *Primary Examiner.*